United States Patent
Rosen et al.

(10) Patent No.: US 9,378,740 B1
(45) Date of Patent: Jun. 28, 2016

(54) COMMAND SUGGESTIONS DURING AUTOMATIC SPEECH RECOGNITION

(71) Applicant: Amazon Technologies, Inc., Seattle, WA (US)

(72) Inventors: Alexander David Rosen, Somerville, MA (US); Yuwang Yin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/502,572

(22) Filed: Sep. 30, 2014

(51) Int. Cl.
*G10L 15/26* (2006.01)
*G10L 15/18* (2013.01)

(52) U.S. Cl.
CPC .................. *G10L 15/26* (2013.01); *G10L 15/18* (2013.01)

(58) Field of Classification Search
None
See application file for complete search history.

(56) References Cited

U.S. PATENT DOCUMENTS

| 8,412,699 | B1 | 4/2013 | Mukherjee et al. |
| 8,612,414 | B2 | 12/2013 | Lee et al. |
| 8,631,004 | B2 | 1/2014 | Mishne et al. |
| 2005/0131677 | A1* | 6/2005 | Assadollahi ............ G10L 15/22 704/201 |
| 2008/0065383 | A1* | 3/2008 | Schroeter ................ G10L 13/06 704/260 |

OTHER PUBLICATIONS

A. Bhargava, et. al., "Easy Contextual Intent Prediction and Slot Detection," Proceedings of the 2013 IEEE International Conference on Acoustics, Speech and Signal Processing (ICASSP) (May 2013).

* cited by examiner

*Primary Examiner* — Jeremiah Bryar
(74) *Attorney, Agent, or Firm* — Knobbe Martens Olson & Bear LLP (57) ABSTRACT

Features are disclosed for identifying and providing command suggestions during automatic speech recognition. As utterances are interpreted, suggestions may be provided based on even partial interpretations to guide users of a client device to commands available via speech recognition.

21 Claims, 6 Drawing Sheets

COMMAND SUGGESTIONS DURING AUTOMATIC SPEECH RECOGNITION

BACKGROUND

Speech processing systems include various modules and components for receiving spoken input from a user and determining what the user meant. In some implementations, a speech processing system includes an automatic speech recognition ("ASR") module that receives audio input of a user utterance and generates one or more likely transcriptions of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Speech processing systems may also include a natural language understanding ("NLU") module that receives textual input, such as a transcription of a user utterance, and determines the meaning of the text in a way that can be acted upon, such as by a computer application. For example, an NLU module may be used to determine the meaning of text generated by an ASR module using a statistical language model. The NLU module can then determine the user's intent from the ASR output and provide the intent to some downstream process that performs some task responsive to the determined intent of the user (e.g., generate a command to initiate the phone call, initiate playback of requested music, provide requested information, etc.).

As the intents which may be recognized are subject to change such as according to new NLU modeling, new system commands, etc., a need exists to provide suggested commands (e.g., intents) during automatic speech recognition operations such as search rather than waiting for completion of the automatic speech recognition.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Many applications and consumer electronics devices are voice command enabled. For example, a media player, such as the FIRETV™ by Amazon.com. After a user turns on such a device, she may not know what voice commands are supported. Based on natural instinct, she may say, "I want to watch Transformers 4." The device may correctly process the user's command depending on a variety of factors such as whether the speech recognition system supports the function (e.g., intent) of the command. If the system does not recognize the command, the system performance is impacted because valuable resources are expended to attempt the processing of an unknown or invalid command. Furthermore, the user experience is impacted. For example, the user may become frustrated and wonder whether she is speaking an appropriate command. Accordingly, to reduce the resources spent processing badly formed commands and enhance the usability of the system, a list of commands may be presented via the device such as on a user interface.

Providing the list of commands is one level of assistance. For a given command, there may be more robust commands provided by the system. Such robust commands may further serve to improve system performance by narrowing the scope for a given command. For example, a search for a movie starring Bill Murray may return fifty or one hundred results. But a search for a movie starring Bill Murray from the 1980s may return a more focused result set with a fraction of the results found in the broader, "Bill Murray"-only search. By accessing the system via the focused command, the amount of resources needed to process, generate, transmit, and present a result for a command can be reduced. As noted above, a user may attempt to perform a narrow command, but not be aware of the valid form. It would therefore be helpful to clearly indicate whether the system supports the command in a different format or whether the system does not support the command. By providing clear responses to speech commands, the user experience will be improved by reducing user frustration (e.g., by performing commands in way different than expected by the user, or by failing to perform a command that the user expects to be available, etc.) and encouraging users to try similar or additional commands which may improve the efficiency of the requesting device, the receiving device, or both.

Consider a further example where the system receives audio data for the utterance, "Find movie." The speaker may pause during the utterance (e.g., 1 second, 5 seconds, etc.). The pause may seem brief to the user, but may actually be a significant amount of time for a speech recognition system. This pause may be used by a speech processing system to help interpret the utterance and provide the user suggested commands that may be used to find movies. The suggested command may be provided for presentation via a user interface, listing search suggestions like "Find movie directed by someone; Find Movie released during the year of; etc." The user can then pick one of the suggestions and finish her voice search query. The selection may be received through a manual input, such as a finger tap selection of a list item list via a touchscreen. The selection may simply be an utterance by the user of the command shown on a provided menu of suggestions.

The way in which the audio data is processed by the speech recognition system may be leveraged to provide the suggestions. For example, a complete utterance may be transmitted to the speech recognition system. As the utterance is processed, intermediate translations may be available. These intermediate translations may be used to identify and provide suggestions. The suggestions may be identified and provided during the processing of the entire utterance but before a complete translation is completed. In this way, the user experience will be improved because the suggestions arrive more timely than when waiting for a full translation. Furthermore, the suggestions may include one or more refinements that can reduce the overall resource utilization to process the spoken command, such as including a narrowing criterion for a find command as described with reference to the actor search discussed above.

The suggestions described are provided during audio data processing. As such, the speaker need not complete an utterance for suggestions to be provided. Any available interpretations generated by through automatic speech recognition may be used to provide the suggestions. Furthermore, the automatic speech recognition may be an iterative process whereby as audio data is received, the interpretations are refined. A suggestion may be provided based on an incremental result of a first iteration while the recognition process continues iterating to generate further interpretations. By operating during audio data processing, a further non-limiting advantage of delivering suggestions as the user is speaking which can help guide the user to a desired intent (e.g., function or command) is provided.

During text input searches, some systems are configured to provide common phrases which may be completed based on the partially entered search terms. Providing suggestions during speech recognition presents a much more complex processing and suggestion process than simply querying word lists. First, the speech recognition is based on predicted intents. That is, the audio data is interpreted and a prediction of what was said is formed. As more audio data is received, the prediction can change. For example, a speaker may begin with "Show me a movie" and pause. This phrase may take a number of different meanings such as "Show me a movie entitled Gigli" or "Show me a movie book featuring Gus Wheatly." These examples also assume a clear prediction can be generated by the system. The spoken phrase may have been "Show me a groovy look featured in US Weekly." This interpretation of this utterance may be confused with "Show me a movie book featuring Gus Wheatly" due to the linguistic similarities of the two expressions. Accordingly, the speech recognition system described in this application can leverage a partial result (e.g., the recognized result of the wholly speech spoken so far), to perform natural language processing to extract the user's current intent. The current partial result can be indicated such as via the user interface of the requesting client device. In addition, the current intent may be used to provide suggested voice commands, that is commands which are based on (e.g., refinements of) the partial result.

In addition to providing suggested commands, completion values may also be suggested. For example, consider a command for loading a media item from a user's personal library. If the command identifying an intent to load such an item is received, a suggestion including not only the command but also referencing an available item may be provided by the system. In some implementations, the suggestions may be for a command. To provide example inputs to the command, information may be retrieved from the user's personal profile. This allows the suggestions to be relevant to the speaker rather than general or ambiguous.

Although the examples and implementations described herein focus, for the purpose of illustration, on using command suggestions during audio data processing in an automatic speech recognition context, one skilled in the art will appreciate that the techniques described herein may be applied to other processes, methods, or systems. For example, the techniques may be used with other types of systems which generate incremental results for input audio data for purposes other than automatic speech recognition or natural language understanding. Various aspects of the disclosure will now be described with regard to certain examples and embodiments, which are intended to illustrate but not limit the disclosure.

Command Suggestion System Overview

Figure 1:
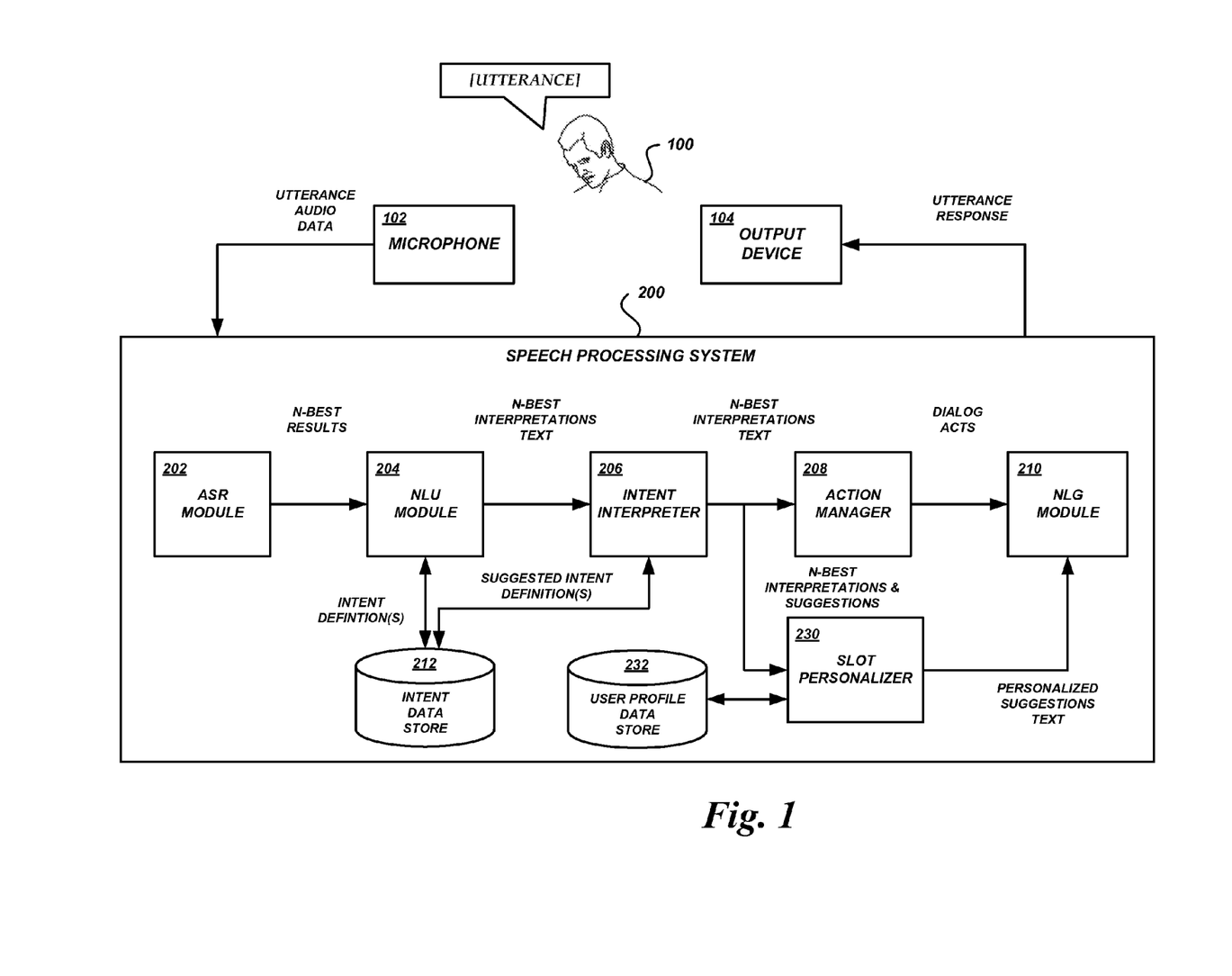
FIG. 1 is a network diagram of an example of a system incorporating command suggestions during automatic speech recognition.

FIG. 1 is a network diagram of an example of a system incorporating command suggestions during automatic speech recognition. The speech processing system shown in FIG. 1 may implement aspects of the present disclosure. In particular, FIG. 1 shows example data flows between various speech and language processing modules in response to receipt of user utterances. A user 100 may make an utterance, such as an utterance that includes a spoken command for a computing system to perform some task. In one specific non-limiting example, the user 100 may say "Search for flights departing from Los Angeles next Friday." The user 100 may speak the utterance into (or in the presence of) a client device operated by the user.

Figure 3A:
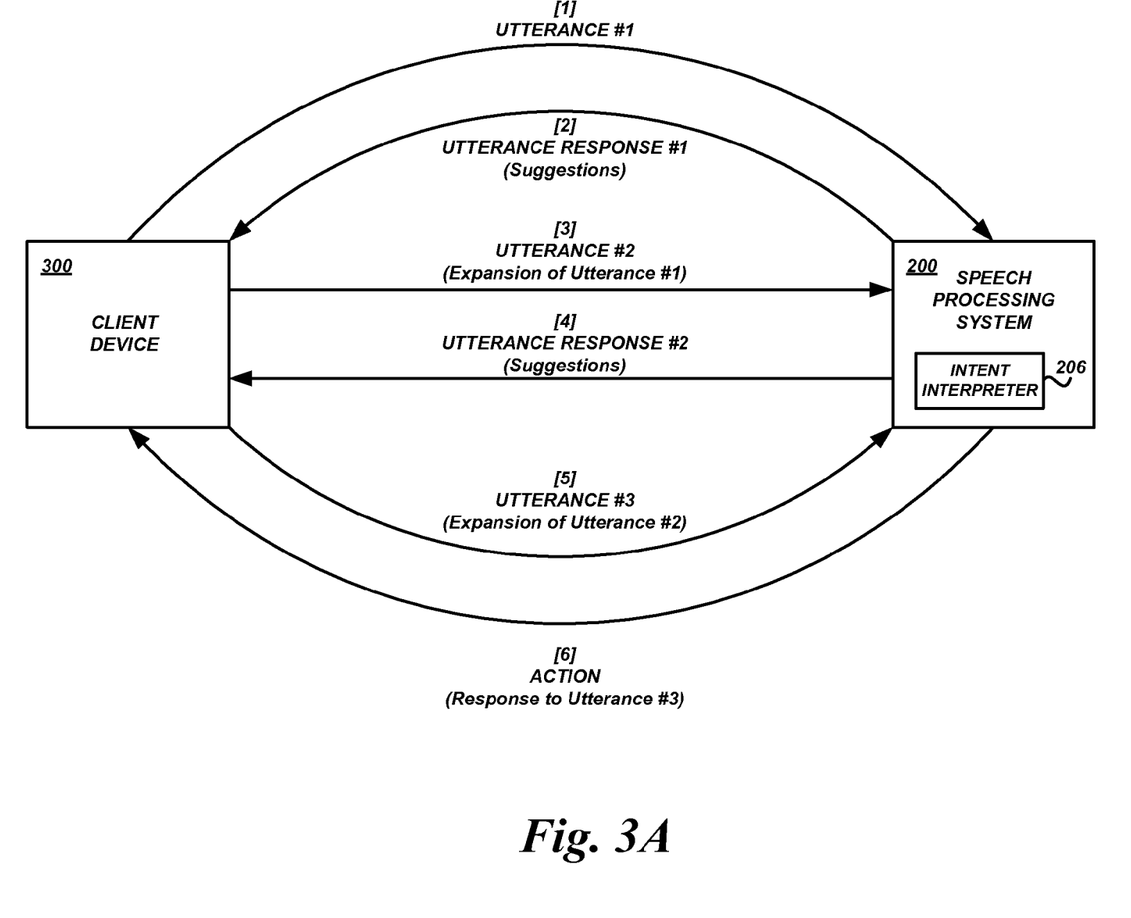
FIG. 3A shows a message flow diagram illustrating messages that may be exchanged between entities for command suggestions during automatic speech recognition.

The client device (e.g., client device 300 shown in FIGS. 3 and 5) can correspond to a wide variety of electronic devices. In some embodiments, the client device may be a computing device that includes one or more processors and a memory which may contain software applications executed by the processors. The client device may include or be in communication with an audio input component for accepting speech input on which to perform speech recognition, such as a microphone 102. The client device may also include or be in communication with an output device 104 for presenting responses or other information from the speech processing system 200, such as a speaker or a display. The software of the client device may include at least one of hardware components or software for establishing communications over wireless communication networks or directly with other computing devices. Illustratively, the client device may be a mobile device, such as a mobile phone, personal digital assistant ("PDA"), mobile gaming device, media player, electronic book reader, tablet computer, laptop computer, or the like. In some embodiments, the client device may be a substantially stationary device, such as a television with program execution capabilities and network connectivity (a "smart TV"), set-top box, gaming console, home entertainment system, desktop computer, server computer, or the like.

As shown in FIG. 1, user utterances may be provided to a speech processing system 200. The speech processing system 200 can be a network-accessible system in communication with the client device via a communication network, such as a cellular telephone network or the Internet. A user may use the client device to submit utterances, receive information, and initiate various processes, either on the client device or at the speech processing system 200. For example, the user can issue spoken commands to the client device in order to search for plane tickets as described above, set timers, listen to music, search, initiate phone calls, etc.

The speech processing system 200 may include an ASR module 202 that performs automatic speech recognition on audio data regarding user utterances, an NLU module 204 that performs natural language understanding on results generated by the ASR module 202, an intent interpreter 206 which identifies intent definitions and suggested intent definitions based on the interpretations generated by the NLU module 204. The interpretations generated by the NLU module 204 may include a textual representation of the received audio data. In such implementations, the intent definitions are identified based on the textual representation where the intent definition includes information corresponding to language expressing an intent. Therefore, by matching all or a portion of the textual representation with the language representing the intent as included in the intent definition, the system 200 can predict the desired action for the utterance. An action manager 208 is shown and may be configured to manage the system 200 response to an utterance. For example, some utterances may be part of a user interaction with the speech processing system 200. The action manager 208 may be configured to, for example, initiate various dialog acts as part of the interaction. A natural language generation ("NLG") module 210 may be included in the speech processing system 200. The NLG module 210 is configured to provide utterance responses. For example, when the action manager 208 may provide certain dialog acts which the NLG module 210 is configured to convert into user-understandable communications (e.g., text that can be "read" to the user by a text-to-speech or "TTS" component). As another example, the NLG module 210 may be configured to provide personalized suggestions based on one or more identified intent definitions. A slot personalizer 230 may be included to tailors identified intents and suggested intents provided by the intent interpreter 206. The tailoring may be based on user profile information which may include one or more of: previously purchased items by a user associated with the device providing the audio data, previously viewed items by a user associated with the device providing the audio data, demographic information for a user associated with the device providing the audio data, location information indicating the location of the device providing the audio data and time or date the audio data is provided.

The system 200 may include an intent data store 212 configured to maintain intent definitions which include information corresponding to language expressing an intent corresponding to the intent definition. The intent may be a command to initiate a feature of the system 200 such as search, play, or order. An intent definition may include one or more slots. A slot may generally refer to an input field for an intent definition. For example, "Play a movie called (slot A)" may include the intent of "play a movie" with one slot "slot A" which is a placeholder for a movie name. It will be appreciated that an intent definition may have more than one slot. The intent data store 212 may include information about the type of input value for a slot. For example, some slots may be numeric "Find a movie costing less that (slot B) dollars" where slot B is a number. Other slot types may include text, movie title, song title, actor name, date, time, location, device type, operating system or other type information to both direct the interpretation of the uttered intent and guide the personalization of suggestions.

An intent may be identified by more than one linguistic expression. For example, consider the intent to play the song Poker Face by Lady Gaga. A user may express this as "Play Poker Face by Lady Gaga" or, as one alternative, "I'd like to hear Poker Face by Lady Gaga." Both utterances include the same intent to play a specific song. A user may also indicate different combinations and ordering of slots. For example, a person may speak "Play Poker Face," "Play Poker Face by Lady Gaga," "Play Lady Gaga's song Poker Face," or "Play Poker Face from the album The Fame."

To describe the different manners in which an intent may be expressed, an intent definition may be used. Any suitable form may be used for an intent definition. For example, an intent definition may include a list of regular expressions or a context-free grammar that describe different ways of expressing an intent. An intent definition may describe different ways of expressing a specific intent, such as playing the song Poker Face, or it may more generally describe a class of intents such as all intents for playing a song. A variety of intent definitions may be created. For example, an intent definition may be created for playing a song, playing an album, playing all music by an artist, requesting the time, or requesting the weather.

Accordingly, the intent data store 212 may include several intent definitions. An intent definition includes information corresponding to language expressing an intent corresponding to the intent definition. The intent definitions generally serve as semantic templates for the underlying intent which can trigger a command of the system 200.

The system 200 may also include a user profile data store 232. The user profile data store 232 may be configured to maintain personalization information for generating suggestions. For example, previously purchased items by a user associated with the device providing the audio data, previously viewed items by a user associated with the device providing the audio data or demographic information for a user associated with the device providing the audio data may be maintained in the user profile data store 232. The user profile data may be inserted into slots for suggested commands thereby providing a meaningful suggestion to an identified user (e.g., an account for a user of the system). For example, without personalization, the suggestion may be merely, "Find a book titled __________" where the blank is provided to the user. In some systems, a default value may be provided such that the suggestion may be provided as "Find a book titled The War of Art." However, the title may be confusing and, in some instances, offensive to some users. Accordingly, the described systems and methods allow the slot to be filled based on the uttering user's profile such that a user having purchased a large quantity of iguana related items may receive a personalize suggestion as "Find a book titled The Ingenious Iguana and Their Incredible Owners" based on the quantity of iguana material purchased or an actual purchase of the book having the inserted title.

In some implementations, additional speech processing elements may be included to further refine the speech recognition process. For example, a context interpreter (not shown) which applies contextual rules to current NLU results based on prior interpretations and dialog acts may be included. Such additional elements may be included before or after the intent interpreter 206. In some implementations, it may be desirable to include additional refinements before intent interpretation by the intent interpreter 206 to reduce the number of interpretations. In some implementations, it may be desirable to include additional processing elements after intent interpretation to allow a broader number of intents to be identified and potentially suggested.

The speech processing system 200 may include any number of server computing devices, desktop computing devices, mainframe computers, and the like. Each individual device may implement one of the modules or components of the speech processing system 200. In some embodiments, the speech processing system 200 can include several devices physically or logically grouped together to implement one of the modules or components of the speech processing system 200. For example, the speech processing system 200 can include various modules and components combined on a single device, multiple instances of a single module or component, etc. In one specific, non-limiting embodiment, the speech processing system 200 may include a server or group of servers configured with ASR and/or NLU modules 202, 204, a server or group of servers configured with an intent interpreter 206, slot personalizer 230 and/or an action manager 208, etc. In multi-device implementations, the various devices of the speech processing system 200 may communicate via an internal communication network, such as a corporate or university network configured as a local area network ("LAN") or a wide area network ("WAN"). In some cases, the devices of the speech processing system 200 may communicate over an external network, such as the Internet, or a combination of internal and external networks.

In some embodiments, the features and services provided by the speech processing system 200 may be implemented as web services consumable via a communication network. In further embodiments, the speech processing system 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing system 200 may be integrated into the client device such that network connection and one or more separate computing systems are not necessary to perform the processes of the present disclosure. For example, a single client device may include the microphone 102, the ASR module 202, the NLU module 204, the intent interpreter 206, the slot personalizer 230 or some combination thereof.

Returning to the examples described above and in greater detail below, users may submit utterances that may include various commands, requests, and the like. The microphone 102 may capture utterance audio and provide it (or data derived therefrom) to the speech processing system 200. The ASR module 202 may generate ASR results for the utterance, such as an n-best list of transcriptions. Each transcription or portion thereof may be associated with some score, such as a confidence score or a likelihood that the transcription or portion thereof is correct. The n-best list or some other type of results may be provided to the NLU module 204 so that the user's intent may be determined. In some implementations, the ASR results may be a partial result representing an intermediate result for audio data received. In such implementations, the partial result may be used for suggesting commands as described herein.

An n-best list of interpretations (e.g., intents) may be determined or generated by the NLU module 204 and provided to the intent interpreter 206. The intent interpreter 206 can process the NLU results (e.g., modify individual interpretations, filter interpretations, re-score or re-rank interpretations, etc.) as described in greater detail below, and provide processed results to the action manager 208. Illustratively, the intent interpreter 206 may merge a current NLU result with a prior result that was stored in a context data store (not shown) based on the application of a context interpretation rule. The action manager 208 may then generate a response (e.g., a confirmation) based on the merged result, and the NLG module 210 can translate the semantic response generated by the action manager 208 into human-readable text, synthesized speech, etc. The semantic response generated by the action manager 208 can be stored in the context data store (not shown), along with semantic representations of prior responses, user utterances, and the like.

Command Suggestion Method Overview

Figure 2:
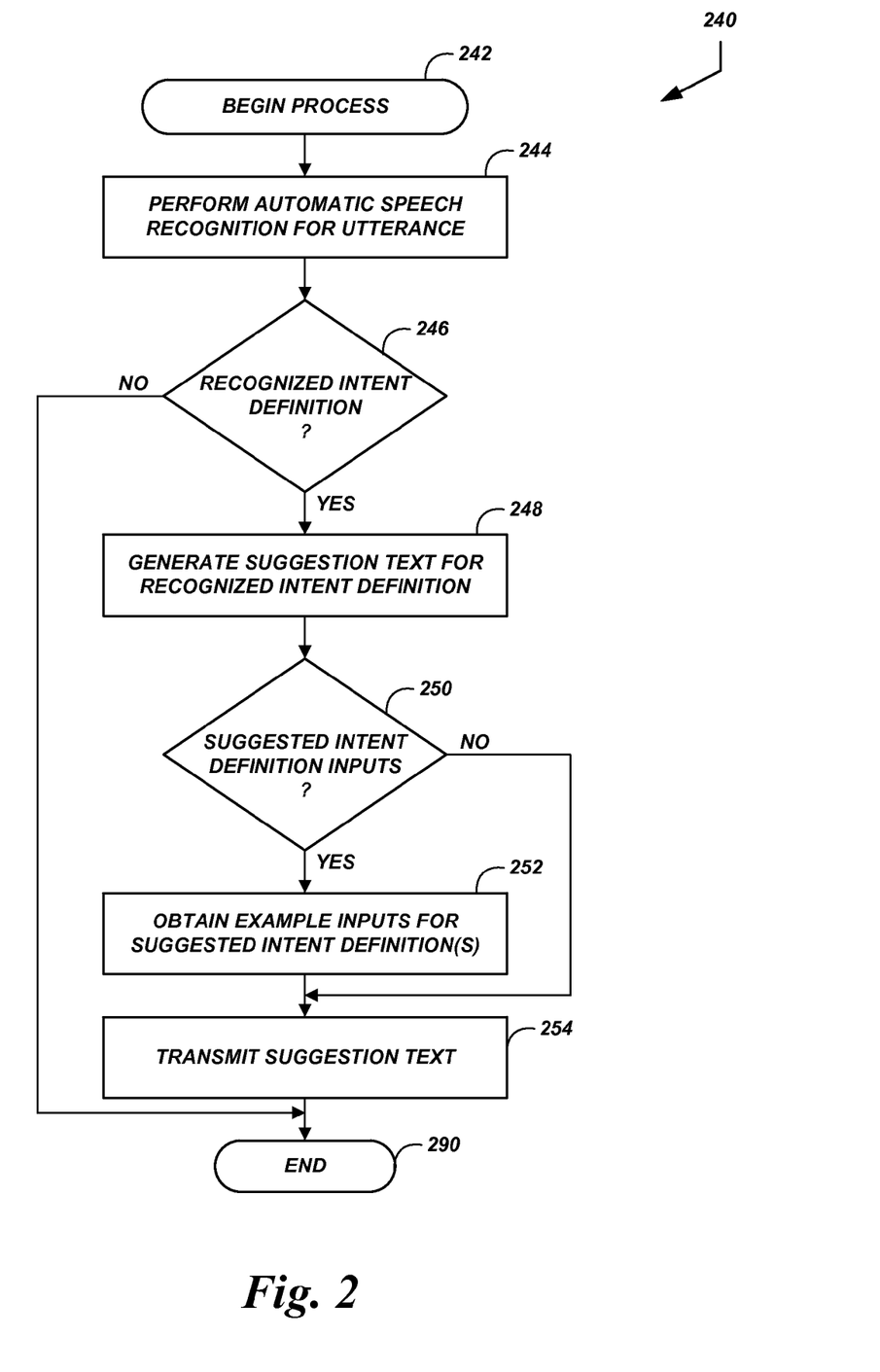
FIG. 2 shows a process flow diagram of a method for personalized command suggestions.

FIG. 2 shows a process flow diagram of a method for personalized command suggestions. The method shown in FIG. 2 may be implemented in whole or in part by the speech processing system 200 shown in FIG. 1.

The process 240 begins at block 242. The process 240 generally is initiated upon receipt of audio data such as an utterance. At block 244, automatic speech recognition is performed for the received utterance. It will be appreciated that the speech recognition performed at block 244 may be for a partial utterance (e.g., more audio data will be provided by the speaker) or for part of a received utterance (e.g., received audio data being processed iteratively or in portions). For example, the audio data may include information for the phrase "when is the next" without any additional phrases. The additional phrases may be omitted because of system failure, the way in which the audio data is being parsed for transmission from the input device to the speech processing system 200, or because the speaker paused. The ASR module 202 may provide one or more results (e.g., transcriptions) for the received utterance. Additional confidence information may be included to indicate the degree of certainty in a particular result. In some implementations, ASR may be configured to provide alternate text corresponding to the received audio data.

At decision block 246, a determination is made as to whether an interpretation is associated with an intent definition of the system 200. For example, the determination may be based on the language in an intent definition expressing an intent which may be associated with a system 200 command such as search, play, look up, or the like. If the interpretations (or any alternative version thereof generated by ASR) generated at block 244 are not recognized, the process 240 proceeds to end block 290. The process 240 may be iteratively performed by receiving additional audio data to refine the recognition process. As such, the process 240 may begin anew with the additional audio data.

Returning to decision block 246, if an interpretation received from the automatic speech recognition includes a recognized intent definition, the process 240 continues to block 248 where suggestion text is generated for the recognized intent based on the interpretation and a suggested intent identified thereby. In some implementations, the generating at block 248 may include generating a list of suggestion text for the intent definition recognized at block 244. A first portion of the suggestion text may match the interpretation text. The suggestion text corresponds to language expressing a first intent, and the first intent corresponds to the suggested intent definition of the plurality of intent definition. The list of suggested intents may be generated based on a stored list of intent definitions which are available for a given word or expression. In one implementation, the intent definition list may be stored as a tree. Table 1 below provides three example levels of a tree which may be used for generating suggestions. It will be appreciated that the number of levels in a system may be increased or decreased and the number of entries may be increased or decreased. For example, one implementation may define fifty level 1 intent definitions, and each level 1 intent definition may include an average of ten level 2 definitions which in turn may each include an average of five level 3 definitions. The tree may be used to represent the feature vectors supported by the system 200. In some implementations, the term "base level intent definition" may be used to refer to a point in the feature tree from which other sub-command definitions (e.g., child level intent definitions, sub-intent definitions, or narrowing intent definitions) may descend. In such implementations, the root level feature generally refers to a broader category than its child level feature. The text from the speech recognition may be used to identify an intent definition and the suggested intent definition may include the identified intent (if partially matched by the received audio data) and those intent definitions which are children intent definitions of the identified intent.

TABLE 1

| Level 1 | Level 2 | Level 3 |
| --- | --- | --- |
| "find" | | |
| | "movie by" | |
| | | "title" |
| | | "actor" |
| | "song by" | |
| | | "artist" |
| | | "price" |
| | | "release date" |
| "call" | | |
| | "person's name" | |
| | "phone number" | |

The suggestion process at block 248 may include comparing a word from the transcription to words in the list. For example, the transcription may begin with "find." As such, additional sub-levels of functionality available for "find" may be included in the listing. For each item identified for the suggestion list, an input value may be accepted. For example, for the intent "call" a slot "person's name" may be filled with audio data representing a person's name such as a person included in a contacts database. It will be further appreciated that the text for the received transcription may correspond to language expressing multiple intents. In some implementations, additional suggestion text may be generated using the received text and the suggested intent definition. It will be further appreciated that the received text may be associated with language expressing multiple intent definitions. In such implementations, further suggestion text may be generated using the received text for the audio data and a different intent definition corresponding to a different intent.

At decision block 250, a determination is made as to whether any of the suggested intent definitions accept an input value. If none of the suggested intent definitions include a slot, the process 240 proceeds to block 254 where the suggestion text is transmitted (e.g., communicated, stored, etc.). The transmission at block 254 may include direct transmission to the client device which provided the audio data. In some implementations, the transmission may include transmitting to another element included in the speech processing system 200 such as the NLG module 210. Transmission may be direct (e.g., point-to-point) or via one or more intermediaries such as a memory device, a proxy server, a router, a pre-processor (e.g., encryption, authentication, compression), or a post-processor (e.g., decryption, decompression).

Returning to decision block 250, if the process 240 determines that a suggested intent definition accepts an input value, at block 252, example inputs are obtained for the suggested intent definitions which accept input values. The example inputs may be obtained from a stored slot listing such as the intent definition for the narrowed intent. The inputs may be personalized such that the example slot filling values are of interest to a user of the client device providing the audio data. For example, the client device may conduct a login or other identification procedure that allows the system 200 to identify aspects of the user of the client device. A user of a client device may be identified based on a username, an identifier for the client device (e.g., media access control ("MAC") identifier), a token, a browser cookie, or other persistence or semi-persistent identification information. Based on the identified user, slot filling values may be selected. For example, if a content library or purchase history is an identifiable aspect of the user, an element included in the content library or purchase history may be used to fill the slot. For example, if the user's content library contains or the user previously purchased an album by Stevie Wonder, the slot filling value for a song title may be one of the songs on the album purchased by the user. The identified values are included in the suggestion text for the associated intent definition. The process 240 then continues to block 254 as described above to transmit the text for the suggested intent definitions.

The process 240 ends at block 290. It will be appreciated that the process 240 may be repeated as additional or new audio data is obtained to provide refined suggestions. In some implementations, the previously provided suggestions may be cached for subsequent use. In such implementations, the sub-intent definitions identified along with any identified slot input values may be stored for the identified user and considered by the method such as at block 248 to generate the suggested intent text or block 252 to obtain example inputs for suggested intent definitions.

Example Utterance Based Suggestion Interactions

FIG. 3A shows a message flow diagram illustrating messages that may be exchanged between entities for feature suggestions during automatic speech recognition. The message flow of FIG. 3 shows messages exchanged between several entities which can be included in a system incorporating command suggestions during automatic speech recognition such as that shown in FIG. 1. For ease of explanation, the number of entities shown has been limited. However, it will be understood that additional entities can be added or multiple entities combined consistent with the description herein.

The speech processing system 200 and a user of the client device 300 can each take turns and exchange messages to achieve some goal, such as finding a song, buying music, booking a flight, etc. As described above, each user utterance can be represented by an interpretation (a semantic representation of the meaning of a user utterance, or some portion thereof), and each system communication can be represented by a response such as a dialog act (a semantic representation of the meaning of a system prompt, or some portion thereof), system action, or a suggestion.

Figure 3B:
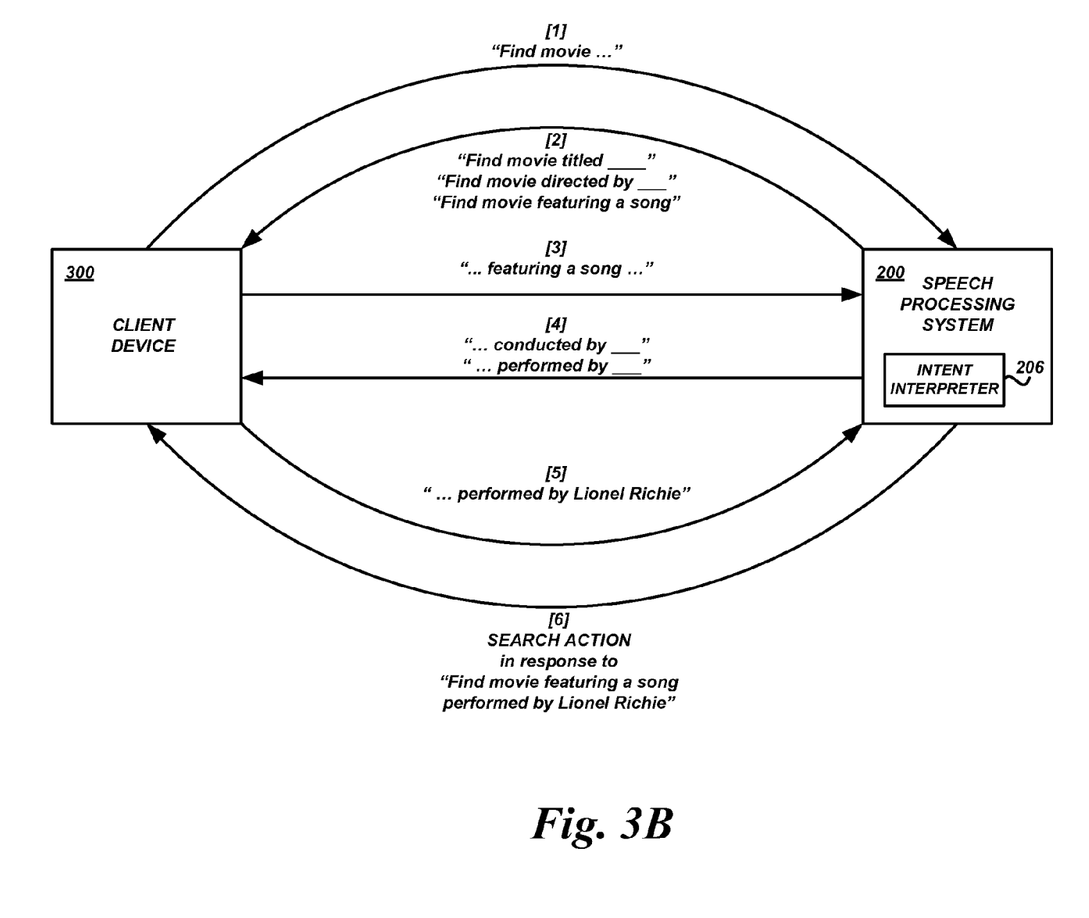
FIG. 3B shows examples for the information that may be included in the messages shown in FIG. 3A.

FIG. 3B provides examples for the information that may be included in the messages shown in FIG. 3A. The examples illustrated in FIGS. 3A and 3B (along with the other examples herein) are described with reference to particular system commands for illustration purposes only.

A user may make a first utterance of an interaction, which is transmitted by the client device 300 to the speech processing system 200 at [1]. FIG. 3B illustrates this first utterance as "Find movie" at [1]. It will be appreciated that the utterance may be partial due to a variety of reasons such as user pausing, client device 300 parsing and transmission of the received audio data, or a communication error between the client device 300 and speech processing system 200.

Along with the utterance, message [1] may also include device characteristics for the client device 300. The device characteristics may be used by the speech processing system 200 in identifying suggestions and personalizing the suggestions for presentation. For example, if the client device 300 is communicating via a low-bandwidth connection with the speech processing system 200, fewer suggestions may be provided than if a high-bandwidth connection were in use. Another example may include formatting of the suggestions. In some implementations, the client device 300 may have display limitations (e.g., colors, area, media type/format). When generating the suggestions, the speech processing system 200 may identify an optimal suggestion format based on the received device characteristics. In some implementations, the device characteristics may be stored in a memory accessible to the speech processing system 200. In such implementations, the device characteristic transmitted by the client device 300 may include identifying information for the client device 300 such that the stored characteristics may be obtained (e.g., "looked up").

Message [1] may establish or be associated with a speech recognition session. The session may be associated with a value that can be exchanged in messages between the client device 300 and speech processing system 200 to facilitate iterative operations for a client device.

The intent interpreter 206 identifies intents and suggested intents based on the interpretations generated by the NLU module 204. In some implementations, the suggestions may be personalized as described above.

As shown in FIG. 3A, at [2] an utterance response including the identified and, optionally personalized, suggestions is transmitted from the speech processing system 200 to the client device 300. The client device 300 may be configured to present the suggestions to a user of the client device 300. The presentation may include displaying on a graphical user interface the list of suggestions. The presentation may include playing audio via the client device 300. In some implementations, the suggestions may be directly presentable as transmitted by the speech processing system 200. This may be desirable in implementations where the client devices served by the speech processing system 200 have variable resources for providing suggestions. In off-loading the formatting of suggestions for a client device to the speech processing system 200, the resources expended by a client device in presenting the suggestions may be conserved.

In some implementations, the suggestions may be processed by the client device 300 prior to presentation. For example, the suggestion may be parsed and re-formatted according to the client device 300 operational characteristics. Such re-formatting may include scaling, cropping, changing colors or font for presentation, or trimming (e.g., removing) the suggestions to fit the client device 300.

As shown in FIG. 3B, message [2] may include the suggestions: "Find movie titled ________", "Find movie directed by ________"; and "Find movie featuring a song." In implementations where personalization is included, the blanks may be filled with personalized slot values.

Message [3] carries a second utterance which is an expansion of the utterance from message [1] from the client device 300 to the speech processing system 200. FIG. 3B provides an example second utterance for message [3] as " . . . featuring a song . . . ."

To this point, the identified intent is "Find a movie featuring a song." The speech processing system 200 via the intent interpreter 206 may further identify suggestions for intents which are related to the expanded utterance received in message [3]. Message [4] provides the suggestions to the client device 300 for presentation as described above. FIG. 3B illustrates possible suggestions for this intent "conducted by ________" and "performed by ________".

A third utterance which includes an expansion of the second utterance is provided via message [5] by the client device 300 to the speech processing system 200. As shown in FIG. 3B, the third utterance is the intent along with a slot value, namely "performed by Lionel Richie." The complete intent at this point is "Find a movie featuring a song performed by Lionel Richie."

The speech processing system 200 via the intent interpreter 206 may determine that no further suggestions are available. As such, message [6] may include a action in response to the received intent. For "find" intents, the response may include a list of items matching the intent (e.g., search results). For the example shown in FIG. 3B, this may include a list of movies such as "The Hot Flashes", "The Great Gatsby", "In a World . . . ", "Rio", "Shrek Forever After" and "The Wedding Singer."

The messaging illustrated in FIGS. 3A and 3B show the use of incrementally processed utterances by the speech processing system 200 to generate suggestions. It will be appreciated that the process of identifying and providing suggestions may be implemented using partial results of a complete utterance being processed by the speech processing system 200. As such, the speech processing system 200 may provide suggestions even when the user has completed the spoken input. This can enable further discovery of the features of the system 200 and encourage more effective commands in the future which can reduce the resources expended by at least one of the client device 300 or the speech processing system 200.

Example Utterance Based Suggestion Method with Personalization

Figure 4:
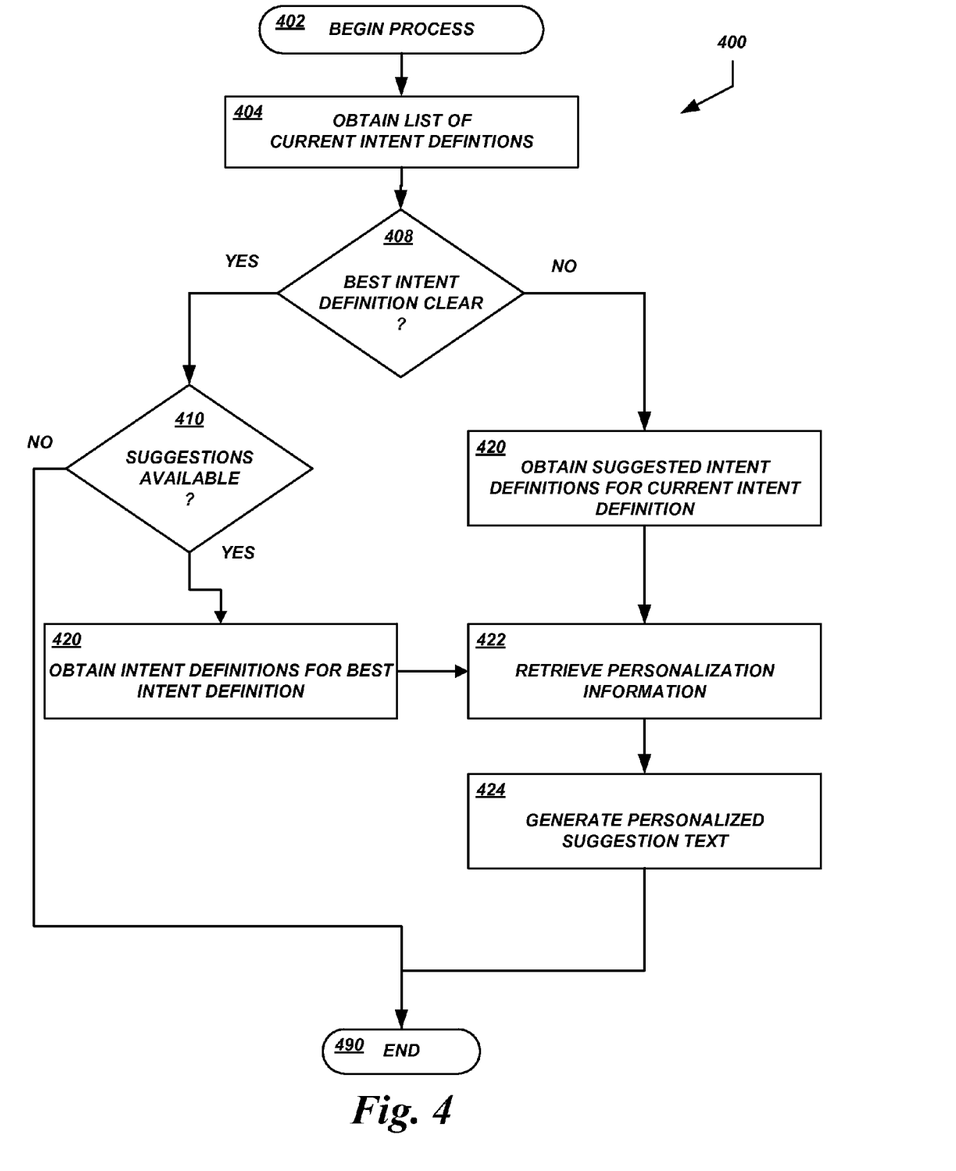
FIG. 4 shows a process flow diagram illustrating suggestions for speech recognition with personalization.

FIG. 4 shows a process flow diagram illustrating a method of providing suggestions for speech recognition with personalization. The method 400 shown in FIG. 4 may be implemented in whole or in part by the speech processing system 200 shown in FIG. 1.

The method 400 begins at block 402. At block 404, a list of current intent definitions is obtained. The list of current intent definitions of an utterance may be obtained from, for example, the NLU module 204 by the intent interpreter 206. The list of current intent definitions may include confidence information for each identified intent definition. The confidence information may indicate how likely a given definition is thought to be the "correct" interpretation of the intent. In some implementations, the order of the intent definitions in the list may be used to indicate a relative confidence in the interpretations whereby the first item is the most likely and continuing in descending order of confidence.

At block 408, a determination is made as to whether the best intent definition is clear. The determination may be based on a preconfigured confidence value whereby the "best" interpretation is one which exceeds the preconfigured confidence value. The determination of a best intent definition is included to help the intent interpreter determine whether further intents and/or intent definitions should be suggested, or if the intent definition clearly identifies a complete intent.

If the determination is made that the best intent definition is clear, at block 410, a determination is made as to whether there are any suggested intent definitions available for the identified intent definition. For example, returning to the examples in Table 1, if the intent definition is identified as "find movie by", two levels of intent definitions are identified. For the level 2 intent "movie by", there are two suggestions available. As such, at block 420, the suggested intent definitions for the intent definitions identified at block 404 are obtained. The identified intent definition may identify a first set of intents. The suggested intent definitions represent a subset of the first set of intents. At block 422, personalized information needed to fill any slots included in the suggested intent definitions are obtained as described herein. At block 424, the personalized suggestion text is generated. The suggestions may be generated in a machine readable format such that they can be transmitted to a client device or provided for further processing within the speech processing system such as via the NLG module 210. Generating the personalized suggestions may include identifying slot values needed and types of information for each slot value. The generating may include merging the retrieved personalization information into the appropriate slots. The process 400 then terminates at block 490.

Returning to decision block 410, no suggestions may be available for the best clear intent definition. For example, if the interpretation is "call 800-111-2222", by the example shown in Table 1, no further suggestions are available. As such, the process 400 may terminate at block 490.

Still referring to FIG. 4, returning to block 408, if a best clear intent definition is not identified, the process 400 continues to block 420. An example of no best clear definition may be present when the current interpretations definitions include intent definitions associated with confidence scores below the predetermined minimum or definitions having the same confidence scores such that no one intent definition is identified as the best.

In such cases, suggested intent definitions may be obtained for one or more of the current interpretations at block 420. The number of suggestions obtained may be limited based on the confidence of identified intent definitions. For example, a predetermined intermediate confidence score may be defined such that intent definitions are obtained for textual data from ASR which exceed the intermediate confidence score. The number of suggestions obtained may be limited based on resource levels such as time, memory, power, processor cycles, message size, network bandwidth and the like. In such implementations, the process 400 at block 420 obtains a suggested intent definition for the first item on the list and, if resources remain, obtains suggestions for additional items until the resource is expired. This may be useful in situations where client devices have limited resources whereby the number of suggestions may be limited on the server side to accommodate the available resources for communicating or displaying the suggestions from the speech recognition system 200. The resource level may be determined dynamically based on a characteristic of the client device which provided the underlying data for the current interpretations.

Once the expansions are obtained, at block 422 as described above, the personalization information is retrieved. At block 424, the personalized suggestion text is generated and the process 400 terminates at block 490.

Execution Environment

Figure 5:
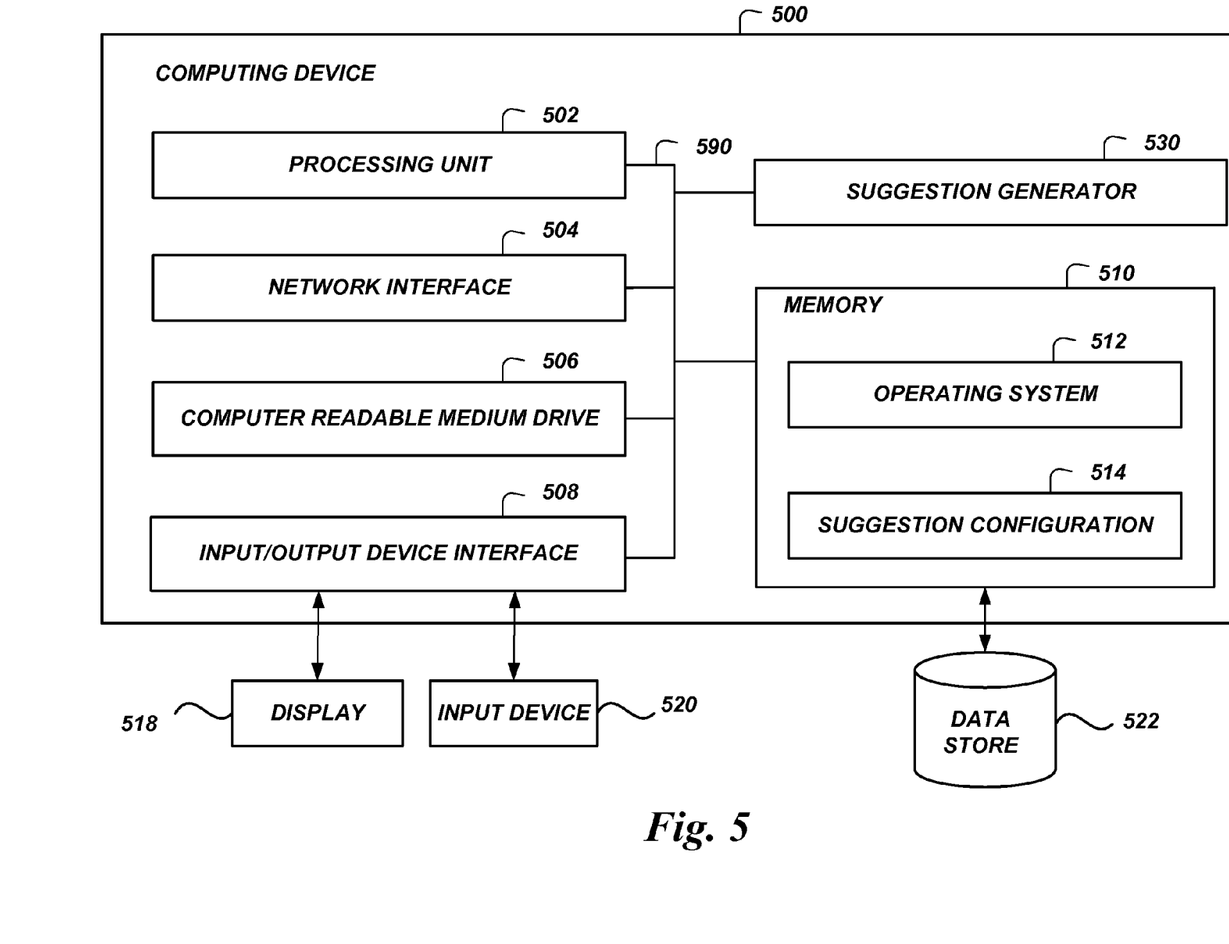
FIG. 5 is a functional block diagram of a computing device for personalized command suggestions.

FIG. 5 is a functional block diagram of a computing device for personalized feature suggestions. The computing device 500 can be a server or other computing device, and can comprise a processing unit 502, a suggestion generator 530, a network interface 504, a computer readable medium drive 506, an input/output device interface 508, and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510 and output information to an optional display 518 via the input/output device interface 508. The input/output device interface 508 can also accept input from the optional input device 520, such as a keyboard, mouse, digital pen, microphone, mass storage device, etc.

The suggestion generator 530 may be implemented to generate command suggestions as described in the present application. For example, the suggestions generator 530 may obtain some text from automatic speech recognition generated from audio data for an utterance. In one example, the text may be "Order pizza." The suggestion generator 530 may then select an intent definition from a set of stored intent definitions. In the example "order pizza", the intent definition may be a refinement of the "order pizza" intent such as "order pizza from pizzeria", "order pizza from cheapest pizzeria near my current location", "order pizza from highest rated pizzeria near my current location", etc. The selection may be based on a comparison of the first text with language expressing the intent associated with the first intent definition. In this example, the intent is "order pizza" and the identified intent definitions are narrowing intents of the basic idea of ordering pizza. The suggestion generator 530 may then be configured to generate a message including suggestion text using the obtained text and the first intent definition such that a first portion of the suggestion text matches the obtained text. The suggestion text corresponds to language expressing a first intent and the first intent corresponds to the first intent definition of the plurality of intent definition. Thus, in this example the intent is order pizza. The intent definitions include "order pizza", "order pizza from pizzeria", "order pizza from pizzeria", "order pizza from cheapest pizzeria near my current location", and "order pizza from highest rated pizzeria near my current location". The suggestion text may include, for example "order pizza from pizzeria" where the suggestion text begins with the translated text received from automatic speech recognition (e.g., "order pizza").

The memory 510 contains computer program instructions that the processing unit 502 executes in order to implement one or more embodiments. The memory 510 generally includes at least one of RAM, ROM or other persistent, non-transitory computer readable media. The memory 510 can store an operating system 512 that provides computer program instructions for use by the processing unit 502 or other elements included in the computing device in the general administration and operation of the computing device 500. The memory 510 can further include computer program instructions and other information for implementing aspects of the present disclosure.

For example, in one embodiment, the memory 510 includes a suggestion configuration 514. The suggestion configuration 514 may include one or more of the inputs described above with reference to providing suggestions such the feature tree or the confidence values described above. The suggestion configuration 514 may store values for a given configuration. The suggestion configuration 514 may, in some implementations, store information for obtaining a given configuration. For example, the available feature list (e.g., feature tree) may be specified as a network location (e.g., URL) in conjunction with username and password information to access the word list. The memory 510 may also include or communicate with one or more auxiliary data stores, such as data store 522. The data store 522 may electronically store data regarding client device characteristics, feature trees, intents, slots, slot types, thresholds described above for use during suggestion generation and personalization, personalization information, and the like.

The elements included in the computing device 500 may be coupled by a bus 590. The bus 590 may be a data bus, communication bus, or other bus mechanism to enable the various components of the computing device 500 to exchange information.

In some embodiments, the computing device 500 may include additional or fewer components than are shown in FIG. 5. For example, a computing device 500 may include more than one processing unit 502 and computer readable medium drive 506. In another example, the computing device 502 may not be coupled to a display 518 or an input device 520. In some embodiments, two or more computing devices 500 may together form a computer system for executing features of the present disclosure. In some implementations, the suggestion generator 530 may be implemented in part with the processing unit 502.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more physical computer processors in communication with the computer-readable memory, wherein the one or more physical computer processors are programmed by the executable instructions to at least:
      receive audio data from a client device;
      perform automatic speech recognition to obtain a transcript of the audio data, the transcript including first text for the audio data;
      select an intent definition from a plurality of intent definitions, the intent definition selected based on a first textual expression included in the intent definition and on the first text;
      generate second text using the first text and the intent definition, wherein a portion of the second text matches the first text, wherein the second text corresponds to a second textual expression included in the intent definition; and
      transmit the second text to the client device.

2. The system of claim 1, wherein the one or more physical computer processors are further programmed by the executable instructions to generate third text using the first text and the intent definition, wherein a portion of the third text matches the first text, wherein the third text corresponds to a third textual expression included in the intent definition, and wherein the third textual expression includes more information than provided via the first textual expression identified by the first intent definition.

3. The system of claim 1, wherein the one or more physical computer processors are further programmed by the executable instructions to:
   select a second intent definition from the plurality of intent definitions, wherein the second intent definition is identified by the first text; and
   generate third text using the first text and the second intent definition, wherein a portion of the third text matches the first text, wherein the third text corresponds to one of the second textual expressions included in the second intent definition.

4. The system of claim 1, wherein the first intent definition further includes a slot definition identifying a data type, and
   wherein the one or more physical computer processors are further programmed by the executable instructions to:
      obtain a user identifier for the client device;
      obtain an example text value of the data type for the slot definition based on the user identifier; and
      generate the second text using the example text value in the slot.

5. The system of claim 4, wherein the user identifier comprises one of a username, a media access control identifier, a token, or a browser cookie.

6. The system of claim 4, wherein obtaining the example text value of the data type comprises obtaining the example text value from a content library for the identified user.

7. The system of claim 1, wherein the one or more physical computer processors are further programmed by the executable instructions to:
   perform automatic speech recognition to obtain a second transcription of the audio data, the second transcription including alternate text for the audio data; and
   select the first intent definition using the alternate text.

8. A computer-implemented method comprising:
   under control of one or more computing devices configured with specific computer-executable instructions,
      performing automatic speech recognition using audio data received from a client device to obtain a transcript of the audio data, the transcript including first text for the audio data;
      selecting an intent definition from a plurality of intent definitions, the intent definition selected based on a first textual expression included in the intent definition and on the first text; and
      generating second text using the first text and the intent definition, wherein the second text corresponds to a second textual expression included in the intent definition, and wherein a portion of the second text matches the first text.

9. The computer-implemented method of claim 8, wherein the intent definition includes a slot definition identifying a data type, and
   wherein the method further comprises:
      identifying a user of the client device;
      obtaining an example text value of the data type for the slot definition based on the identified user; and
      generating the second text comprises using the example text value.

10. The computer-implemented method of claim 9, wherein identifying the user comprises receiving one of a username, a device identifier of the client device, a token, or a browser cookie.

11. The computer-implemented method of claim 9, wherein obtaining the example text value of the data type comprises obtaining the example text value from a content library for the identified user.

12. The computer-implemented method of claim 8, further comprising selecting additional intent definitions based on a comparison of a current resource level for one of the speech processing system or the client device to a predetermined resource level.

13. The computer-implemented method of claim 8, wherein performing automatic speech recognition comprises generating alternate text corresponding to the received audio data, and wherein the intent definition is selected using the alternate text corresponding to the received audio data.

14. The computer-implemented method of claim 8, further comprising generating third text using the first text and the intent definition, wherein a portion of the third text matches the first text, wherein the third text corresponds to a third textual expression included in the intent definition, and wherein the third textual expression includes more information than provided via the first textual expression identified by the first intent definition.

15. The computer-implemented method of claim 8, further comprising:
   selecting a second intent definition from the plurality of intent definitions, and wherein the second intent definition is identified by the first text; and
   generating third text using the first text and the second intent definition, wherein a portion of the third text matches the first text, wherein the third text corresponds to one of the second textual expressions included in the second intent definition.

16. A non-transitory computer readable medium storing a computer-executable module that, when executed by a processor of a computing device, cause the computing device to perform a process comprising:
- performing automatic speech recognition using audio data received from a client device to obtain a transcript of the audio data, the transcript including first text for the audio data;
- selecting an intent definition from a plurality of intent definitions, the intent definition selected based on a first textual expression included in the intent definition and on the first text;
- generating second text using the first text and the intent definition, wherein the second text corresponds to a second textual expression included in the intent definition, and wherein a portion of the second text matches the first text.

17. The non-transitory computer readable medium of claim 16, wherein the computer-executable module causes the computing device to store the intent definition by storing a slot definition identifying a data type, and wherein the process further comprises:
- identifying a user of the client device;
- obtaining an example text value of the data type for the slot definition based on the identified user; and
- generating the second text comprises using the example text value.

18. The non-transitory computer readable medium of claim 17, wherein the computer-executable module causes the computing device to obtain the example text value of the data type by obtaining the example text value from a content library for the identified user.

19. The non-transitory computer readable medium of claim 16, wherein the computer-executable module further causes the computing device to perform the process further comprising: generating third text using the first text and the intent definition, wherein a portion of the third text matches the first text, wherein the third text corresponds to a third textual expression included in the intent definition, and wherein the third textual expression includes more information than provided via the first textual expression identified by the first intent definition.

20. The non-transitory computer readable medium of claim 16, wherein the process further comprises:
- selecting a second intent definition from the plurality of intent definitions, and wherein the second intent definition is identified by the first text; and
- generating third text using the first text and the second intent definition, wherein a portion of the third text matches the first text, wherein the third text corresponds to one of the second textual expressions included in the second intent definition.

21. The non-transitory computer readable medium of claim 16, wherein the computer-executable module causes the computing device to perform automatic speech recognition by generating alternate text corresponding to the received audio data, and wherein intent definition is selected using the alternate text corresponding to the received audio data.

* * * * *